(12) United States Patent
Fushiki et al.

(10) Patent No.: US 7,158,670 B1
(45) Date of Patent: Jan. 2, 2007

(54) VISUALLY ERROR-FREE COLOR IMAGE REPRESENTATION

(75) Inventors: Ikko Fushiki, Redmond, WA (US); Hock San Lee, Redmond, WA (US); J. Andrew Goossen, Issaquah, WA (US); Gary K. Starkweather, Bellevue, WA (US); Andrew C. Godfrey, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/384,141

(22) Filed: Aug. 27, 1999

Related U.S. Application Data

(60) Provisional application No. 60/135,361, filed on May 21, 1999.

(51) Int. Cl.
  *G06K 9/00* (2006.01)
  *G09G 5/02* (2006.01)

(52) U.S. Cl. .................................. 382/167; 345/604

(58) Field of Classification Search ................ 382/162, 382/167; 345/589–592, 603, 604, 600
See application file for complete search history.

(56) References Cited

U.S. PATENT DOCUMENTS

| | | | | |
|---|---|---|---|---|
| 4,897,799 | A * | 1/1990 | Le Gall et al. | 345/428 |
| 5,224,178 | A | 6/1993 | Madden et al. | |
| 5,452,111 | A * | 9/1995 | Giorgianni et al. | 358/504 |
| 5,502,580 | A * | 3/1996 | Yoda et al. | 358/518 |
| 5,818,613 | A * | 10/1998 | Masterson et al. | 358/518 |
| 5,946,113 | A * | 8/1999 | Pritchett | 358/520 |
| 5,995,655 | A * | 11/1999 | Lockett et al. | 382/162 |
| 6,025,885 | A * | 2/2000 | Deter | 358/518 |
| 6,249,315 | B1 * | 6/2001 | Holm | 348/251 |
| 6,268,847 | B1 * | 7/2001 | Glen | 345/154 |
| 6,282,311 | B1 * | 8/2001 | McCarthy et al. | 382/162 |
| 6,320,980 | B1 * | 11/2001 | Hidaka | 382/167 |

FOREIGN PATENT DOCUMENTS

WO     WO 97 37281 A     10/1997

OTHER PUBLICATIONS

"Photography—Electronic Still Picture Imaging—Extended sRGB Color Encoding—E-sRGB." Photographic and Imaging Manufactures Association, Inc. First Edition, May 18, 2001.*
Stokes, et al. "A Standard Color Space for the Internet—sRGB". Nov. 5, 1996. http://www.w3.org/Graphics/Color/sRGB.html.*
IEC TC100 sRGB Draft Standard, 1998.*
PCT International Search Report dated Nov. 24, 2000.
Michael Stokes: "Colour Management, Extended precision RGB colour space" IEC, 'Online! Jul. 22, 1998, XP002152214; Retrieved from the Internet: URL:http://w3.hike.te.chiba-u.ac.jp/IEC/100/PT1/parts/part2/1996_45.pdf' retrieved on Nov. 1, 2000! p. 3-p. 6.
Katoh, Naoya and Deguchi, Tatsuya, "Reconsideration of CRT Monitor Characteristics," The Fifth Imaging Conference: Color Science, 1997, pp. 33-40.

\* cited by examiner

*Primary Examiner*—Vikkram Bali
*Assistant Examiner*—Colin LaRose
(74) *Attorney, Agent, or Firm*—Banner & Witcoff, Ltd.

(57) ABSTRACT

The present invention provides a method, apparatus and computer-readable medium for providing high quality substantially visually error-free conversion of color images. The method maps the color values to an expanded colorspace to represent substantially all colors without perceptible visual error and labels an image determined by the mapped color values as an expanded colorspace image. Thus, the present invention may be utilized to provide a linear color management system. In a 16 bit color data value system, transparency/opaqueness information may be stored, and premultiplied or premultiplied and normalized values may be used for blending.

20 Claims, 5 Drawing Sheets

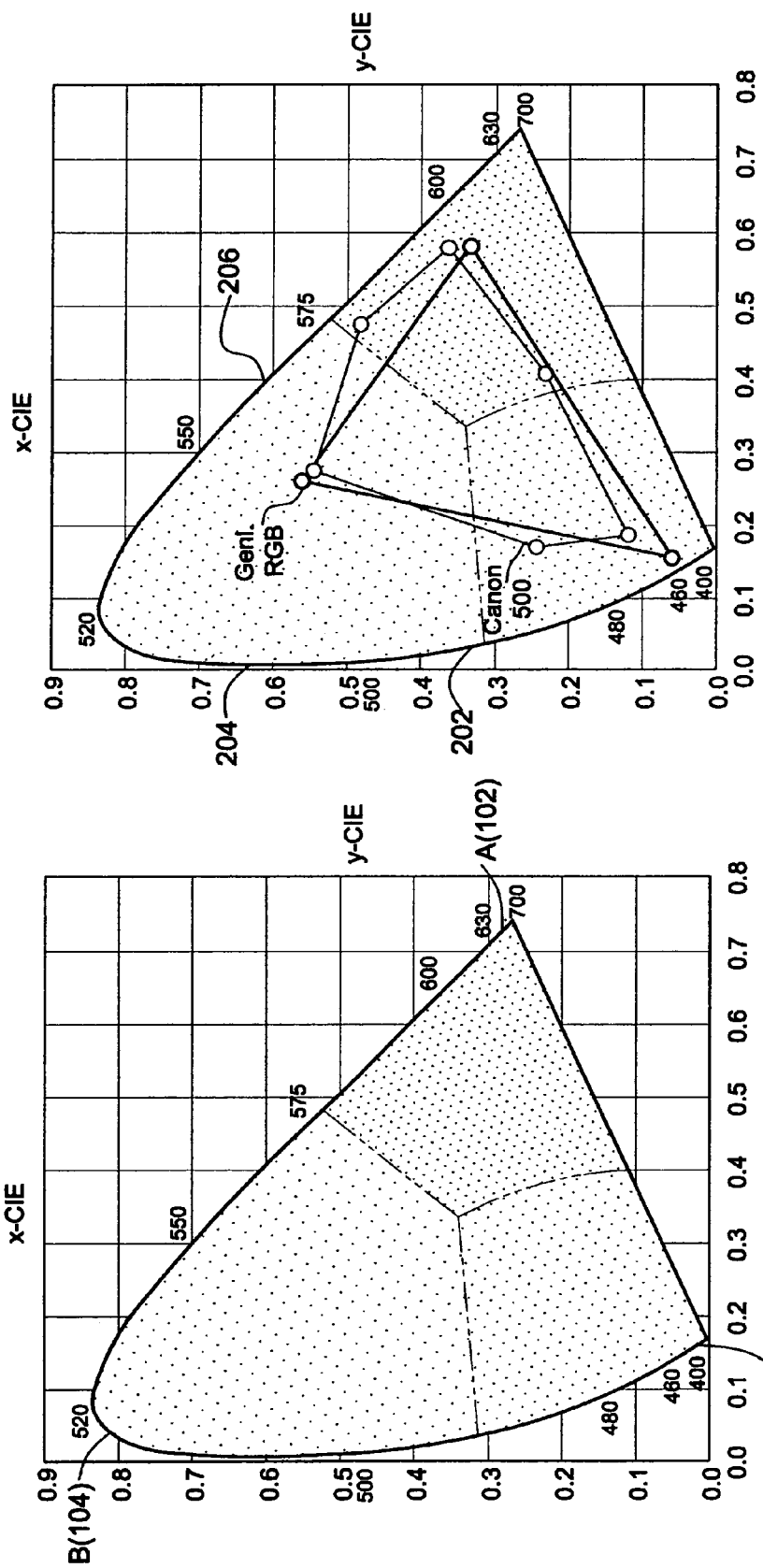

US 7,158,670 B1

VISUALLY ERROR-FREE COLOR IMAGE REPRESENTATION

This application claims the benefit of U.S. provisional application 60/135,361, filed May 21, 1999, which is herein incorporated by reference.

TECHNICAL FIELD

The present invention relates to colorspace interchange and more particularly, to providing substantially visually error-free color data interchange for a plurality of electronic devices.

BACKGROUND OF THE INVENTION

Communication of color information between different devices and industries has become recognized as an important issue. Each industry generally has its own color management history, with its own terminology standards and methods for communicating color information. As more users are connecting different peripheral devices made by different companies and, in addition, communicate with one another over the Internet, it is becoming more urgent to have a standardized color data management scheme that provides consistent color data management. Many different practices and standards are currently being used.

Different phosphor sets are being used to provide the colors of "red", "green", and "blue". For example, where a monitor may illustrate a pink color, and the user selects the pink color, the printer printing the selection may print out an ugly purple/lavender. Thus, different values on chromaticity diagrams represent a same color, providing confusion. Tone reproduction of various systems also differ. Also, viewing conditions may vary, causing colors to appear different to different observers. Thus, due to differing visual conditions, the color of the illuminant (the white point), the absolute level of the scene irradiance (generally the illuminance), the surrounding colors, etc., all affect the color perception unless the initial and final conditions are identical. Unless a white point and illuminance level are the same, the color interchange data may not be identical.

Previous color data conversion methods have required the use of cube root computation or raising values to the third power. To store data, every pixel had to be converted using a set of power function routines. This process is time-consuming, consumes processing power, and may introduce errors. Other techniques, such as is described in U.S. Pat. No. 5,224,178, by Madden et al., provide for compressing digital code values to provide a set of reduced range digital codes of a same resolution, but having a smaller range of basic image content values than the dynamic range of the digitized image data base.

As shown in FIG. 1 the chromaticity diagram has been developed by the Commission Internationale de l'Eclairage (CIE), or International Commission on Illumination, to provide a common chromaticity value for colors. The displayable colors by a laser device are shown as a triangle ABC, with points A 102, B 104, and C 106. Ideally, color values for a device should cover a triangle having an area that extends over the entire visible range. However, as shown in FIG. 2, the triangle covered for color values of a Canon CLC500 color copier/printer 202 is shown along with the old RGB color values (Genl. RGB) 204, the first PC color monitors and the sRGB values 206. While some of the cyan colors are limited by sRGB, the brightest greens and reds are output device limited, but not sRGB limited. Clearly, calculations must be used to convert values of the color copier/printer 202 colors to the ordinary CRT colors (sRGB values) 206.

Although lasers have virtually monochromatic output and the primaries of the laser would reside on the spectrum locus of the CIE (International Commission on Illumination) diagram of FIG. 1, showing 2 degree observer data, typically devices do not have the gamut to display the laser colorspace. Thus, data in a laser display colorspace would have to be converted for display and printing.

Cathode display tubes (CRTs), color flat panels (both active and passive matrix types) and high definition televisions (HDTVs) provide chromaticity diagrams that are similar to the CRT model shown in FIG. 2. However, the sRGB chromaticity diagram lacks a range of gamut that includes all colors, and conversion of sRGB color data values is non-linear, thus often resulting in undesired results.

Thus, color management technology is needed to facilitate color data interchange in the marketplace so that color devices may conveniently exchange color data in a common format without the need to translate constantly between color spaces because of different data representations in various devices.

SUMMARY OF THE INVENTION

The present invention provides complete color representation for substantially the entire visual gamut and represents all colors substantially without visual error. That is, representation of substantially all visible colors typically perceived by the human eye is defined herein as representation of the colors "without visual error" or "visually error free", including representing visually perceptible data values.

The present invention provides an apparatus, method and computer-readable medium for converting digital signals for a color image into high quality error-free expanded color space color images. A normalized RGB color space is defined for color values from 0 to 1. An expanded RGB or an expanded RGBA or expanded sRGB or an expanded sRGBA color space is defined herein to include color values below 0 and/or greater than 1. By extending the color space, the present invention eliminates the need for users to "clamp" color information into the predetermined range than are needed to fully describe the color. For example, where color data information is limited to an 8 bit range of 0 to 255, and a color value of 300 is obtained, data may be "clamped" into the range of 0 to 255, causing color data loss and distortion.

In one embodiment, the method includes obtaining color values; mapping the color values to one of: an expanded RGB or an expanded RGBA or an expanded sRGB or an expanded sRGBA space; and labeling an image determined by mapped color values as an expanded RGB/RGBA or expanded sRGB/sRGBA color space image. The expanded RGB or the expanded RGBA or sRGB or SRGBA space may include at least the visible range of color values. Also, the expanded RGB or the expanded RGBA or sRGB or SRGBA space may be described as a color space defined by a chromaticity diagram that extends into negative component values and beyond 1.0 when normalized to 1.0 in RGB or sRGB, respectively. With respect to terminology, as used herein, "RGB/RGBA" is defined to be interchangeable with the terms "RGB or ARGB" or "RGB or RGB(A)". That is, there is no distinction between the recited terms, and no specific ordering of elements is indicated by the terminology. Further, as used herein, "RGB/RGBA" is to be interpreted as RGB or RGBA; expanded RGB/RGBA" is to be interpreted as expanded RGB or expanded RGBA; and "expanded SRGB/SRGBA" is to be interpreted as expanded SRGB or expanded SRGBA. In the alternative, any of the above terms may be expressed and interpreted as "one of x or y". For example, "expanded RGB/RGBA" may be equivalently expressed as "one of an expanded RGB and an expanded RGBA."

Mapping the color values to an expanded RGB/RGBA or expanded sRGB/sRGBA space may include utilizing multiplication of $R_0$, $G_0$, $B_0$ values by a predetermined matrix, where the $R_0$, $G_0$, and $B_0$ values denote normalized red, green and blue components for a color value. The $R_0$, $G_0$, $B_0$ values may be predetermined based on X, Y and Z values, where X, Y, and Z denote 1931 CIE XYZ values whose Y value has been normalized to 1. Where the $R_0$, $G_0$, and $B_0$ values denote normalized red, green and blue components for a color value, the $R_0$, $G_0$, and $B_0$ values may simply be multiplied by 8192 to obtain the 16 bit components $R_{16}$, $G_{16}$, and $B_{16}$. Where 16 bits are used for color data values, a sign, integer and decimal portion may be set forth, and where selected, transparency information may be stored. Clipping may be used to convert 16 bit values to 8 bit values. As desired, color data values may be non-premultiplied, pre-multiplied, or normalized premultiplied.

In a second embodiment, in a digitized image processing system in which an image digitizer outputs digital signals representing an image, a method for providing high quality error-free conversion of color images from measured color values includes the steps of: mapping the color values to an expanded colorspace wherein the expanded colorspace includes values beyond a visible range of color values and labeling an image determined by the color values mapped to the expanded colorspace as an expanded colorspace image. The modifications described for the above method may be implemented in the method set forth for the second embodiment.

The methods may each be implemented as steps of computer-executable instructions in a computer-readable medium.

In a digitized image processing system in which an image digitizer outputs digital signals representing a color image to an apparatus that converts the digital signals to a high quality error-free expanded colorspace color image, the apparatus includes an expanded colorspace mapper and an image labeller. The expanded colorspace mapper is used for mapping the digital signals to expanded colorspace values wherein the expanded colorspace values include values beyond a visible range of color values. The image labeller is coupled to the expanded colorspace mapper and is used for labeling an image determined by expanded colorspace values as an expanded colorspace image. The apparatus may be adjusted further in accordance with the description above.

BRIEF DESCRIPTION OF THE DRAWINGS

FIG. 1 is a schematic graphical representation of a laser display colorspace upon a CIE colorspace that shows the full gamut of the visual spectrum as is known in the art.

FIG. 2 is a schematic graphical representation of colorspaces for a representative Canon CLC500 color copier/printer, General RGB color values, and sRGB values upon a CIE colorspace diagram as is known in the art.

DETAILED DESCRIPTION OF THE INVENTION

Figure 3:
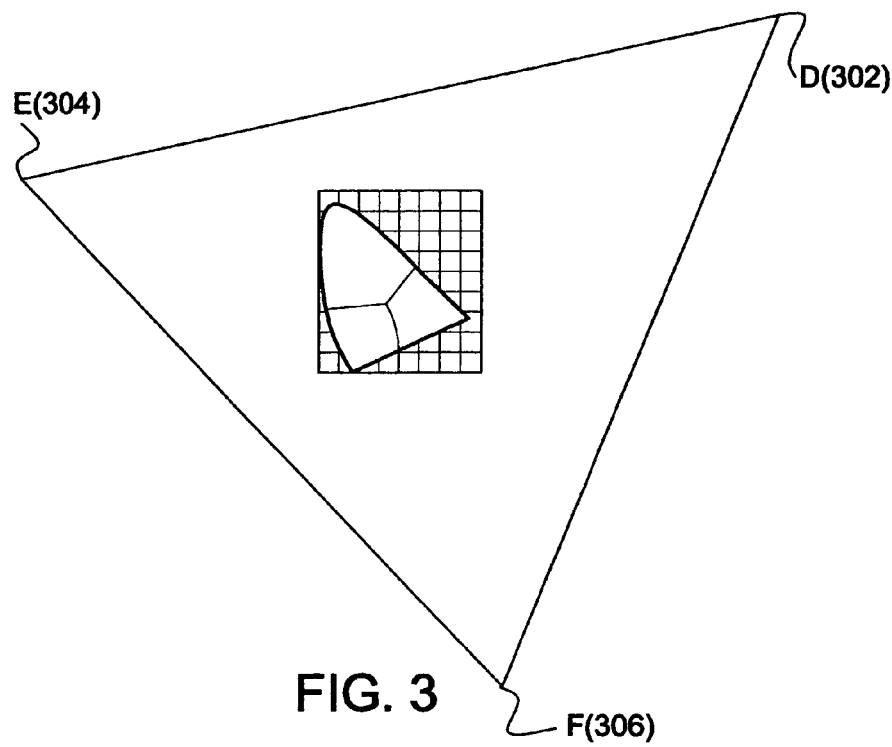
FIG. 3 is a schematic graphical representation of one embodiment of a colorspace in accordance with the present invention.

As shown in FIG. 3, extending the range of color data values for the chromaticity diagram for sRGB beyond 1.0 and below 0.0 on the x and y axes is illustrated by the triangle DEF 302, 304, 306, so that the present invention provides a chromaticity diagram that encompasses all visible color values. For example, in one embodiment, color data values may be expressed in a signed 16-bit integer (13 bits are used for decimals) with a triangle corresponding to (3.24, −0.97, 0.06), (−1.54, 1.88, −0.20), and (−0.50, 0.04, 1.01), thus covering each component within −4 to 4.

By allowing the component of each primary color to be negative and to extend beyond 1.0 (when normalized to 1.0 in sRGB), the present invention's gamut is larger than the visible color space. The data scheme of the present invention, "XsRGB", is also known as "sRGB64. "XsRGB" will be used hereafter to represent the color data scheme of either XsRGB or sRGB64.

Advanced graphic systems require anti-aliasing features (removing ragged edges) and blending (translucency) effects. To achieve these anti-aliasing features and blending effects, an extra component called an "alpha channel" was introduced. To utilize the alpha channel, the linear color components must be expressed in terms of their intensities. However, sRGB and other color management systems typically store color data values in non-linear 8-bit values per channel. The non-linearity is expressed as a "gamma value". For example, Microsoft®'s and Apple®'s color management systems are 2.2 and 1.8, respectively. When only 8 bits were available for color data value representation, it was necessary to convert the color data non-linearly, creating a large gap in the lower intensity values and causing the resulting images to show contours. However, when the size of each component is extended to higher bit (12 bit or higher), the non-linearity requirement is eliminated. Thus, in an embodiment with 12 or more bits for each component, color profiles do not require clipping to a narrower gamut and component values do not have to be non-linearized, avoiding confusion of different gamma values in different color standards. Since, in this embodiment, color values are standardized, standard images may be stored in the XsRGB format without attaching a standardized profile such as an ICC (International Color Consortium) profile to clarify the colors intended. Where desired, an alpha channel may be implemented to store information on transparency. Also, where selected, the color values may be premultiplied by alpha channel values to provide efficient blending.

It is better to define XsRGB more generally by a 4×4 matrix. Also, there is a conversion rule for XsRGB with a different white point.

XsRGB is linear in the visual intensity of each component. Hence, XsRGB can relate linearly to 1931 CIE XYZ values. Let $R_0$, $G_0$, and $B_0$ denote the normalized red, green, and blue components, respectively. Let X, Y, and Z denote 1931 CIE XYZ values, but Y is normalized to 1 instead of 100. The relationship between the normalized XsRGB and XYZ are given by a 4×4 matrix.

$$\begin{pmatrix} R_0 \\ G_0 \\ B_0 \\ 1 \end{pmatrix} = M \begin{pmatrix} X \\ Y \\ Z \\ 1 \end{pmatrix}, \quad (1a)$$

where $$M = \begin{bmatrix} m_{Rx} & m_{RY} & m_{RZ} & t_R \\ m_{GX} & m_{GY} & m_{GZ} & t_G \\ m_{BX} & m_{BY} & m_{BZ} & t_B \\ 0 & 0 & 0 & 1 \end{bmatrix} \quad (1b)$$

Only 12 coefficients are needed to define XsRGB. In addition to the rotational part ($m_{RZ}$, etc.), the transitional part ($t_R$, etc.) is used. With this notation, the white point may be addressed as well as the black point. Using the inverse of the above matrix, the reverse relation from XsRGB to CIE XYZ space is given by:

$$\begin{pmatrix} X \\ Y \\ Z \\ 1 \end{pmatrix} = M^{-1} \begin{pmatrix} R_0 \\ G_0 \\ B_0 \\ 1 \end{pmatrix} \quad (2a)$$

where $$M^{-1} = \begin{bmatrix} n_{XR} & n_{XG} & n_{XB} & u_X \\ n_{YR} & n_{YG} & n_{YB} & u_Y \\ n_{ZR} & n_{ZG} & n_{ZB} & u_Z \\ 0 & 0 & 0 & 1 \end{bmatrix} \quad (2b)$$

A 16 bit definition of RGB components is given by:

$$\begin{bmatrix} R_{16} \\ G_{16} \\ B_{16} \end{bmatrix} = 8192 \times \begin{bmatrix} R_0 \\ G_0 \\ B_0 \end{bmatrix} \quad (2c)$$

In equation (2c), no gamma corrections are required since a sufficient number of bits are available to describe the color data (here, 16 bits).

It is desirable for XsRGB to have a simple transform to sRGB in D65. D50 and D65 are the standard illuminans (the spectrum distributions of the light source) defined by CIE. D50 and D65 are the spectrum distributions similar to the Black Body radiation of 5000 and 6500 Kelvin, respectively. Indeed, it is desirable for XsRGB to be identical to sRGB when its value is inside the range of sRGB. From the sRGB specification, the coefficients of Eq. (1b) and Eq. (2b) are determined as:

$$M_{D65} = \begin{bmatrix} 3.2410 & -1.5374 & -0.4986 & 0 \\ -0.9692 & 1.8760 & 0.0416 & 0 \\ 0.0556 & -0.2040 & 1.0570 & 0 \\ 0 & 0 & 0 & 1 \end{bmatrix} \quad (3a)$$

and $$M_{D65}^{-1} = \begin{bmatrix} 0.4124 & 0.3576 & 0.1805 & 0 \\ 0.2126 & 0.7152 & 0.0722 & 0 \\ 0.0193 & 0.1192 & 0.9505 & 0 \\ 0 & 0 & 0 & 1 \end{bmatrix} \quad (3b)$$

The white point of D65 is $(x_{D65}, y_{D65})=(0.3127, 0.3291)$; the corresponding CIE XYZ values are $$\begin{cases} X_{D65} = x_{D65}/y_{65} = 0.9502 \\ Y_{D65} = 1.0 \\ Z_{D65} = (1.0 - x_{D65} - y_{D65})/y_{D65} = 1.0887 \end{cases} \quad (4)$$

Note that the Y-value at the white point is 1. When the device has the different white point $(X_w, Y_w, Z_w)$, the CIE XYZ coordinates for the appearance match must be transformed by the scaling matrix.

$$S_w = \begin{bmatrix} X_{D65}/X_w & 0 & 0 & 0 \\ 0 & 1 & 0 & 0 \\ 0 & 0 & Z_{D65}/Z_w & 0 \\ 0 & 0 & 0 & 1 \end{bmatrix} \quad (5a)$$

and its inverse is $$S_w^{-1} = \begin{bmatrix} X_w/X_{D65} & 0 & 0 & 0 \\ 0 & 1.0 & 0 & 0 \\ 0 & 0 & X_w/X_{D65} & 0 \\ 0 & 0 & 0 & 1 \end{bmatrix} \quad (7a)$$

The transformation matrix from XYZ to XsRGB at this white point is given by $$M_w = M_{D65} S_w \quad (6a)$$

and its transverse matrix is given by $$M_w^{-1} = S_w^{-1} M_{D65}^{-1} \quad (6b)$$

For an example, the white point of D50 is $(x_{D50}, y_{D50})=(0.3457, 0.3585)$. The corresponding CIE XYZ value is $(X_{D50}, Y_{D50}, Z_{D50})=(0.9643, 1, 0.8251)$. Hence the scaling matrices are $$S_{D50} = \begin{bmatrix} 0.9854 & 0 & 0 & 0 \\ 0 & 1.0 & 0 & 0 \\ 0 & 0 & 1.3195 & 0 \\ 0 & 0 & 0 & 1 \end{bmatrix} \quad (7a)$$

and $$S_{D50}^{-1} = \begin{bmatrix} 1.0148 & 0 & 0 & 0 \\ 0 & 1.0 & 0 & 0 \\ 0 & 0 & 0.7579 & 0 \\ 0 & 0 & 0 & 1 \end{bmatrix} \quad (7b)$$

The resultant transformation matrices for D50 are:

$$M_{D50} = \begin{bmatrix} 3.1937 & -1.5374 & -0.6579 & 0 \\ -0.9550 & 1.8760 & 0.0549 & 0 \\ 0.0548 & -0.2040 & 1.3947 & 0 \\ 0 & 0 & 0 & 1 \end{bmatrix} \quad (8a)$$

and $$M_{D50}^{-1} = \begin{bmatrix} 0.4185 & 0.3629 & 0.1832 & 0 \\ 0.2126 & 0.7152 & 0.0722 & 0 \\ 0.0146 & 0.0903 & 0.7204 & 0 \\ 0 & 0 & 0 & 1 \end{bmatrix} \quad (8b)$$

The appearance match is obtained if the XsRGB values are calculated from the conversion matrix of the device white point. The absolute match may be obtained if the conversion matrix of D65 is used irrespective of the device white point.

Let $(R_w, G_w, B_w)$ denote the normalized RGB value obtained with the matrix $M_w$ defined in Eq. (6a) for the specific white point. The $(R_w, G_w, B_w)$ value is used to do the appearance match and is called the appearance RGB value. When the absolute match is needed, the RGB values $(R_0, G_0, B_0)$ are used by using the matrix $M_{D65}$ defined in Eq. (3 a), which is called the absolute RGB value. The absolute RGB value is obtained from the appearance RGB value by the following equation:

$$\begin{bmatrix} R_0 \\ G_0 \\ B_0 \end{bmatrix} = M_{D65} S_w^{-1} M_{D65}^{-1} \begin{bmatrix} R_w \\ G_w \\ B_w \end{bmatrix} \quad (9a)$$

The reverse relation is obtained as:

$$\begin{bmatrix} R_w \\ G_w \\ B_w \end{bmatrix} = M_{D65} S_w M_{D65}^{-1} \begin{bmatrix} R_0 \\ G_0 \\ B_0 \end{bmatrix} \quad (9b)$$

Since the XsRGB space is directly linked to CIE XYZ space, it is possible to produce the XsRGB measuring device. The new XsRGB device may be produced by adding the matrix conversion routines to the existing calorimeters. XsRGB values may be measured directly from the device. The device may produce the appearance RGB values and the absolute RGB values.

The default XsRGB space is the case of D65 that is linked to sRGB. Since there is no translational part, Eq. (1 a) with $M=M_{D65}$ can be written with a 3×3 matrix as $$\begin{bmatrix} R_0 \\ G_0 \\ B_0 \end{bmatrix} = \begin{bmatrix} 3.241 & -1.5374 & -0.4986 \\ -0.9692 & 1.8760 & 0.0416 \\ 0.0556 & -0.2040 & 1.0570 \end{bmatrix} \begin{bmatrix} X \\ Y \\ Z \end{bmatrix} \quad (10)$$

Allowing each component to go from −4 to 4 by X, Y, Z values, wherein X, Y, and Z denote 1931 CIE XYZ values wherein Y has been normalized to 1 instead of 100, covers a range larger than the range covered by XYZ. The equation (10) provides one embodiment of a floating point format for XsRGB. When the 16 bit version of XsRGB is utilized, a signed 16 bit integer is used and 8192 ($=2^{13}$) is interpreted as 1 in the normalized value. Hence, the lowest 13 bits are used for the decimal portion.

Conversion from 16 bit color data for the XsRGB format to an 8 bit sRGB format is as follows: Let $C_{16}$ and $C_8$ denote one of the components in 16 bit XsRGB format and 8 bit sRGB format, respectively. The relationships are:

$$\begin{aligned}
C_0 &\equiv C_{16}/8192 & &\text{(Corresponding to the normalized linear XsRGB)} \quad (11)\\
C_8 &= 0 & &\text{for } C_{16} < 0\\
C_8 &= 12.92 \times C_0 \times 255 & &\text{for } 0 \le c_0 < 0.00304 (0 \le C_{16} \le 24)\\
C_8 &= (1.055 \times C_0^{(1.0/2.4)} - 0.055) \times 255 & &\text{for } 0.00304 \le C_0 < 1 (25 \le C_{16} < 8192)\\
C_8 &= 255 & &\text{for } C_0 \ge 1 (C_{16} \ge 8192)
\end{aligned}$$

The above conversions correspond to clipping below 0 and above 8192 of the 16 bit XsRGB when converting to 8 bit sRGB. The clipping routine may be further modified as desired.

The reverse relationships are:

$$C_{16} = 2.4865 \times C_8 \quad \text{for } 0 \leq C_8 \leq 10 \quad (12)$$
$$C_{16} = 8.192 \times [(C_8 + 14.025)/269.025]^{2.4} \quad \text{for } 11 \leq C_8 \leq 255.$$

The extension of sRGB in accordance with the present invention provides a number of advantages. For example, blending operations with an alpha channel may be directly applied to XsRGB since XsRGB is linear. The XsRGB profiles may easily be obtained from the CIE XYZ profiles. When XsRGB is used for color reference, there is no need to rotate color components to display each component in an 8 bit sRGB device. Only gamma correction described in (Eq. 12) above need be used to convert to 8 bit sRGB. Even without an exact calibration, XsRGB yields satisfactory conversion for output for color monitors. The scanned images may generally be stored in XsRGB format without losing bit depths since most scanners produce data in not more than 12 bits in each color component.

Where the alpha channel is also utilized for transparency information, the present invention is referenced as "XsRGBA". For XsRGBA, the additional 16 bit components are used as the alpha channel to store transparency information.

Let us first introduce the normalized alpha channel $A_0$. The values 0 and 1 of $A_0$ are regarded as transparent and opaque, respectively. The four components $(A_0, R_0, G_0, B_0)$ constitute one color value. Multiplying 8192 by each component the XsRGBA component $A_{16}$, $R_{16}$, $G_{16}$, $B_{16}$, called the non-premultiplied XsRGBA, is obtained and $(A_0, R_0, G_0, B_0)$ is called the normalized non-pre-multiplied XsRGBA.

When blending operations are processed, it is more efficient to use RGB values which are multiplied by the alpha value. The four components $(A_0, R_0', G_0', B_0')$, where $R_0'=A_0R_0$, $G_0'=A_0G_0$, and $B_0'=A_0B_0$, are called the normalized premultiplied XsRGB. Multiplying 8192 by each component, the XsRGBA component $A_{16}$, $R_{16}'$, $G_{16}'$, $B_{16}'$ is obtained. This is called the premultiplied XsRGBA.

Each color component is allowed to go beyond 1 and go below 0. The meaning of alpha, $A_0$, is considered in the following way. When a source image, S, is overlaid on the destination image, D, the resultant image, D', is obtained as $$d'=as+(1-a)d \quad (13)$$

where s, d, and d' are one of the normalized color components of the image S, D, and D' at the corresponding pixels, respectively, and a is the alpha value of the source image S at the considering pixel. When a=0, the resultant image remains the same as the destination image. This case is called transparent. When a=1, the resultant image is the same as the source image. This case is called opaque. When a is between 0 and 1, the resultant image is the mixed image between the source and destination images. Usually a is a translucency parameter ranging from transparent (=0) to opaque (=1). However, Eq. (13) may be regarded as the interpolation equation. Hence, when a<0 or a>1, Eq. (13) is very well defined and is extrapolating the source and destination images. The alpha value is an interpolation/extrapolation parameter. a may be smaller than 0 or larger than 1. a<0 is defined as "super transparent" and a>1 is defined as "super opaque." Clearly, colors with the super transparent or super opaque alpha value may fall within an RGB space or outside the RGB space.

Figure 4:
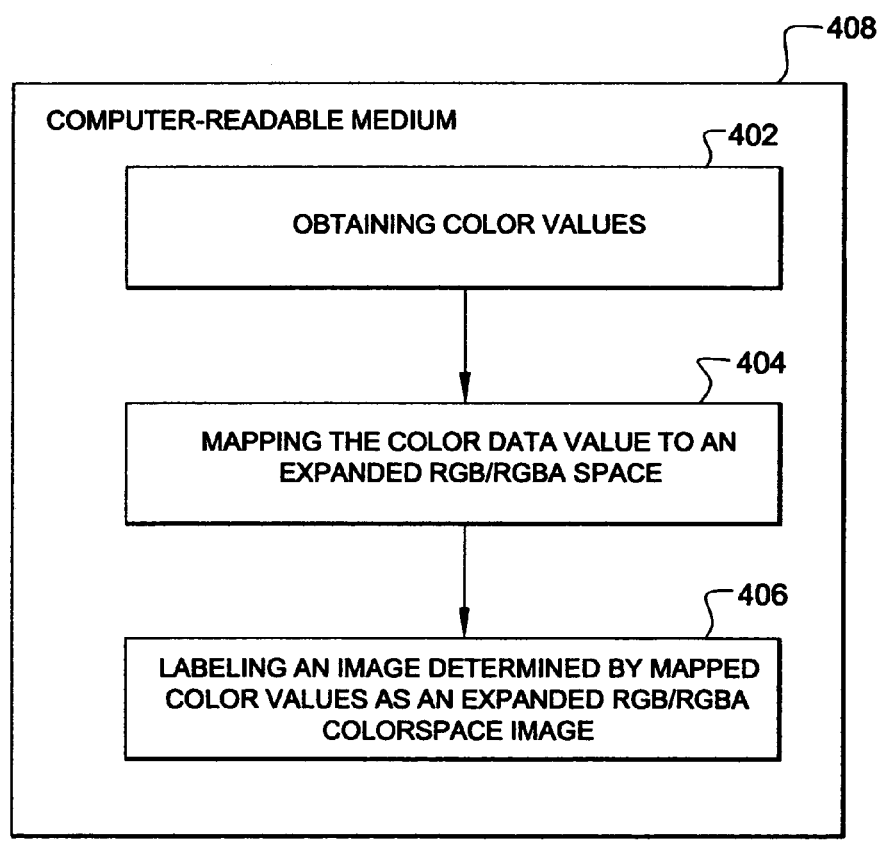
FIG. 4 is a flow chart showing steps in accordance with one embodiment of the method and a computer-readable medium for implementing the present invention.

FIG. 4 is a flow chart showing steps in accordance with one embodiment of the method of the present invention. The method provides high quality error-free conversion of color images and includes the steps of: obtaining 402 color values; mapping 404 the color values to an expanded sRGB/sRGBA space; and labeling 406 an image determined by mapped color values as an expanded sRGB/sRGBA colorspace image. Obtaining 402 the color values may be simply receiving input color values; alternatively, obtaining 402 color values may include measuring the color values. The expanded sRGB or sRGBA space typically includes at least the visible range of color values. Thus, the expanded sRGB or sRGBA space generally includes a colorspace defined by a chromaticity diagram that extends into negative component values and beyond 1.0 when normalized to 1.0 in sRGB. Where selected, mapping 404 the color values to an expanded sRGB or sRGBA space may include utilizing multiplication of $R_0'$, $G_0'$, and $B_0'$ values by a predetermined matrix, where the $R_0'$, $G_0'$, and $B_0'$ values denote normalized red, green and blue components for a color value. In one embodiment, the $R_0'$, $G_0'$, and $B_0'$ values are obtained in accordance with equation (10) above. Where color data values have 16 bits, 1 bit is used for a sign, 2 bits are used for an integer part, and a remaining 13 bits are used for a decimal portion. The 16 bit components $R_{16}$, $G_{16}$, and $B_{16}$ for the color data values may be given by equation (2c). Where color data values have been mapped to 16 bit values, mapping may include clipping the 16 bit values below 0 and above 8192 to convert the 16 bit values to 8 bit values. As described above, the color data values may be non-premultiplied, premultiplied or normalized premultiplied color data values.

Figure 5:
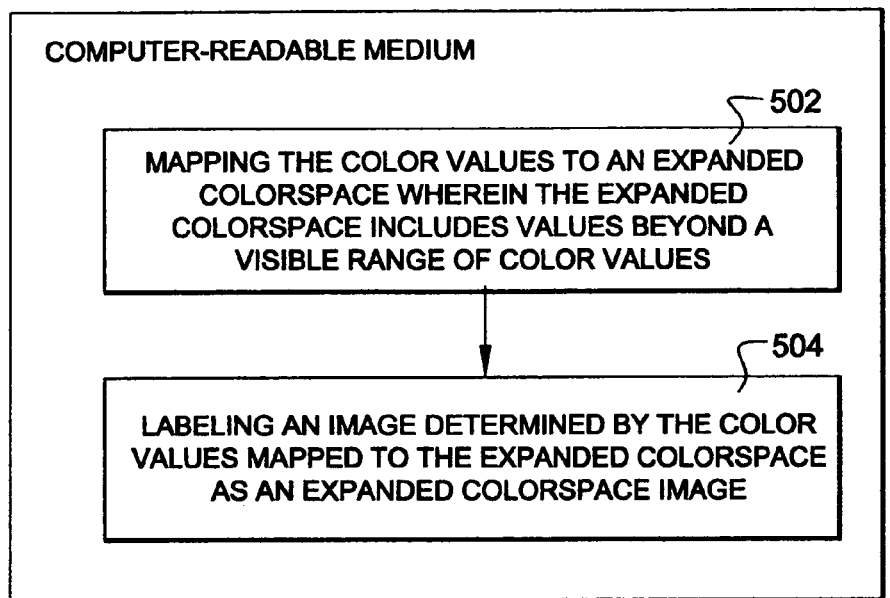
FIG. 5 is a flow chart showing steps in accordance with another embodiment of the method and a computer-readable medium for implementing the present invention.

FIG. 5 shows another embodiment of steps in accordance with the method of the present invention. In a digitized image processing system in which an image digitizer outputs digital signals representing an image, the method provides high quality error-free conversion of color images from measured color values. In this embodiment, the method includes the steps of: mapping 502 the color values to an expanded colorspace wherein the expanded colorspace includes values beyond a visible range of color values; and labeling 504 an image determined by the color values mapped to the expanded colorspace as an expanded colorspace image. Also, the expanded colorspace may include a colorspace defined by a chromaticity diagram that extends into negative component values and beyond 1.0 when normalized to 1.0 in sRGB. Mapping the color values and obtaining the color values may be accomplished as set forth above. Where 16 bit color data values are utilized, the bits may be allocated as set forth above, and 16 bit components $R_{16}$, $G_{16}$, and $B_{16}$ of color data values may also be computed as set forth above. Where desired, clipping, storage of transparency information and premultiplication of color data values may be achieved as discussed above.

The above-described methods may be implemented by a computer-readable medium 408, 506 having computer-executable instructions for performing the steps.

Figure 6:
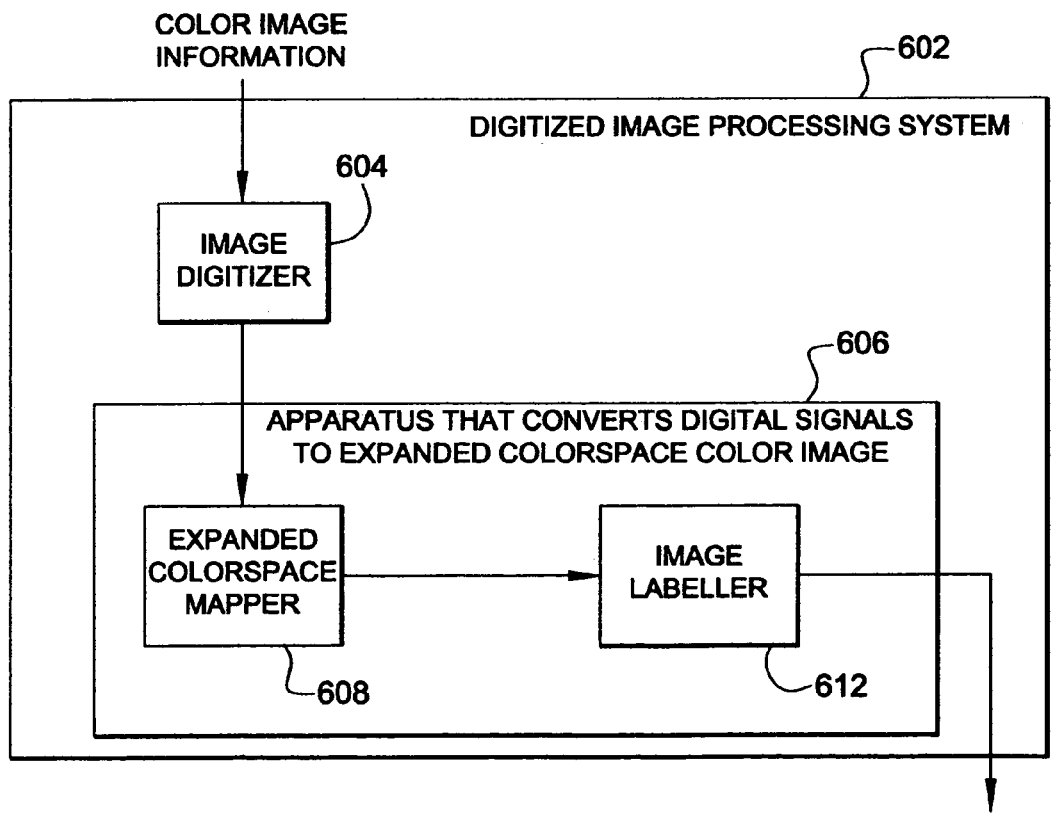
FIG. 6 is a block diagram of one embodiment of an apparatus in a digitized image processing system for converting color images in accordance with the present invention.

FIG. 6 is a block diagram of one embodiment of an apparatus in a digitized image processing system for converting color images in accordance with the present invention. In the digitized image processing system 602, an image digitizer 604 that utilizes color image information to output digital signals representing a color image to the apparatus 606 that converts the digital signals to a high quality error-free expanded colorspace color image. The apparatus 606 includes: an expanded colorspace mapper 608, for mapping the digital signals to expanded colorspace values wherein the expanded colorspace values include values beyond a visible range of color values; and an image labeller 610, coupled to the expanded colorspace mapper 608, for labeling an image determined by expanded colorspace values as an expanded colorspace image. The expanded colorspace may include a colorspace defined by a chromaticity diagram that extends into negative component values and beyond 1.0 when normalized to 1.0 in sRGB. The expanded colorspace mapper may utilize multiplication of $R_0$, $G_0$, $B_0$ values by a predetermined matrix to map the color values to an expanded colorspace. The $R_0$, $G_0$, $B_0$ values may be obtained using equation (9). Where desired, the color data values and their bit components, clipping, transparency information storage and premultiplication and normalization of color data values may be as described for the methods above.

Color operations defined in the RGB/RGBA colorspace may be extended to the expanded RGB/RGBA colorspace. Three examples of color operations in the expanded RGB/RGBA colorspace include:

1. Interpolation between two RGB colors $X=(R_x, G_x, B_x)$ and $Y=(R_y, G_y, B_y)$. The RGB color $Z=(R_z, G_z, B_z)$ that is linearly interpolated between X and Y is given by:

$$R_z = (1-d)R_x + dR_y$$

$$G_z = (1-d)G_x + dG_y$$

$$B_z = (1-d)B_x + dB_y$$

where d is the normalized distance of Z from X to Y, and d=0 at X and d=1 at Y.

2. Digital image composition operations that combine two non-premultiplied RGBA colors. For example, one of the operations, X over Y, where $X=(R_x, G_x, B_x, A_x)$ and $Y=(R_y, G_y, B_y, A_y)$, produces color $Z=(R_z, G_z, B_z, A_z)$. The formula is given by:

$$R_z = A_x R_x + (1-A_x)R_y$$

$$G_z = A_x G_x + (1-A_x)G_y$$

$$B_z = A_x B_x + (1-A_x)B_y$$

$$A_z = A_x A_x + (1-A_x)A_y$$

3. Image convolution operations. For example, a blur filter matrix M is given by:

$$\begin{bmatrix} 1/16 & 1/8 & 1/16 \\ 1/8 & 1/4 & 1/8 \\ 1/16 & 1/8 & 1/16 \end{bmatrix}$$

The blur equation is for each color component. Assuming a RGB color component of a pixel at location (i, j) is C(i,j), the resulting RGB color component of the pixel after the blur operation is given by:

$$(1/16)C(i-1,j-1)+(1/8)C(i-1,j)+(1/16)C(i-2,j+1)+(1/8)C(i,j-1)+(1/4)C(i,j)+(1/8)C(i,j+1)$$

Figure 7:
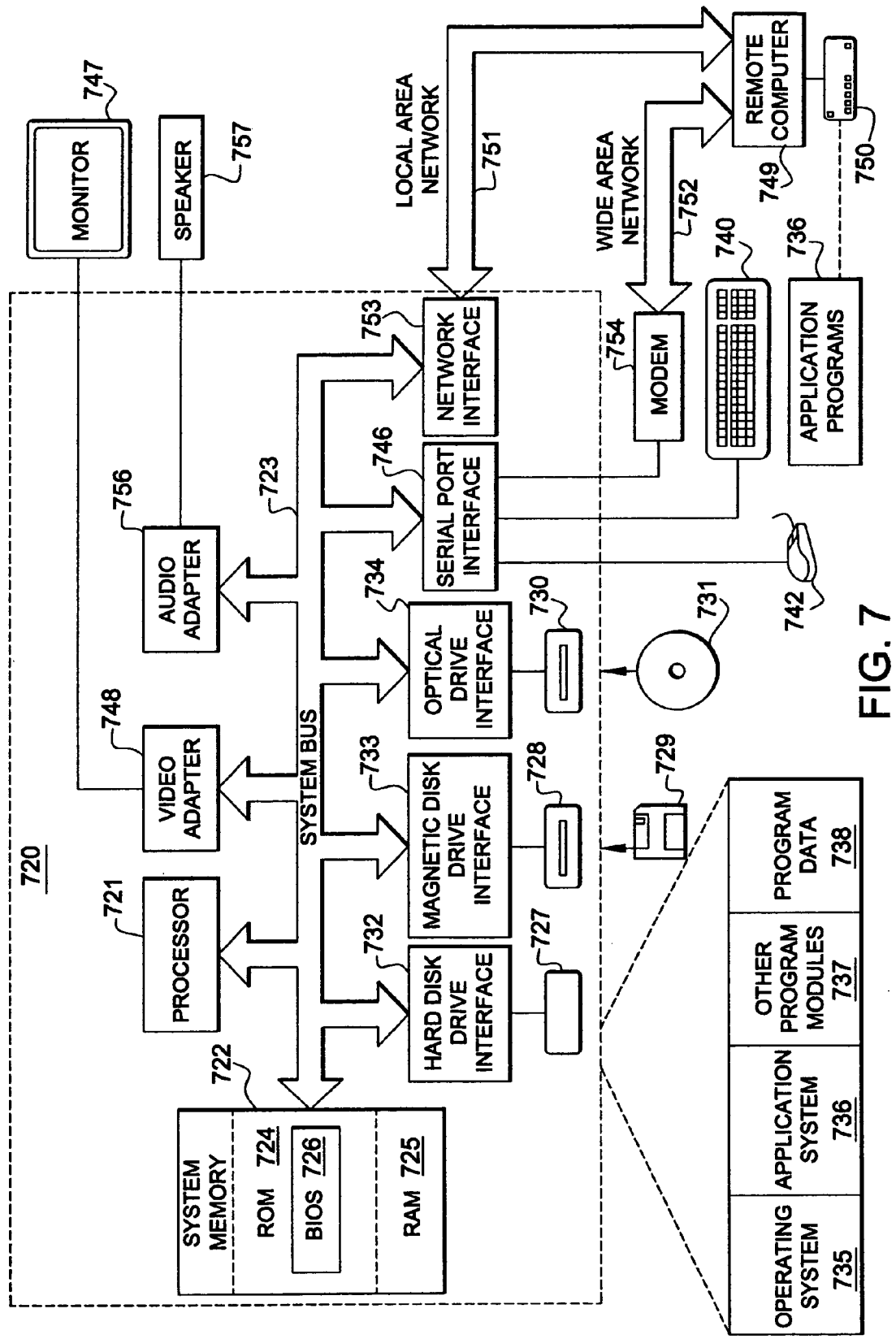
FIG. 7 is a block diagram of a computer system that may be used to implement the method of the present invention.

With reference to FIG. 7, an exemplary system for implementing the invention includes a general purpose computing device in the form of a conventional personal computer 720, including a processing unit/processor 721, a system memory 722, and a system bus 723 that couples various system components including the system memory to the processing unit/processor 721. The system bus 723 may be any of several types of bus structures including a memory bus or memory controller, a peripheral bus, and a local bus using any of a variety of bus architectures. The system memory includes read only memory (ROM) 724 and random access memory (RAM) 725. A basic input/output system 726 (BIOS), containing the basic routines that help to transfer information between elements within the personal computer 720, such as during start-up, is stored in ROM 724. The personal computer 720 further includes a hard disk drive 727 for reading from and writing to a hard disk, not shown, a magnetic disk drive 728 for reading from or writing to a removable magnetic disk 729, and an optical disk drive 730 for reading from or writing to a removable optical disk 731 such as a CD ROM or other optical media. The hard disk drive 727, magnetic disk drive 728, and optical disk drive 730 are connected to the system bus 723 by a hard disk drive interface 732, a magnetic disk drive interface 733, and an optical drive interface 734, respectively. The drives and their associated computer-readable media provide nonvolatile storage of computer readable instructions, data structures, program modules and other data for the personal computer 720. Although the exemplary environment described herein employs a hard disk, a removable magnetic disk 729 and a removable optical disk 731, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 729, optical disk 31, ROM 724, or RAM 725, including an operating system 735, one or more application programs 736, other program modules 737 and program data 738. A user may enter commands and information into the personal computer 720 through input devices such as a keyboard 740 and pointing device 742. Other input devices (not shown) may include a microphone, joystick, game pad, satellite dish, scanner or the like. These and other input devices are often connected to the processing unit 721 through a serial port interface 746 that is coupled to the system bus, but may be connected by other interfaces, such as a parallel port, game port or a universal serial bus (USB). A monitor 747 or other type of display device is also connected to the system bus 723 via an interface, such as a video adapter 748. In addition to the monitor, personal computers typically include other peripheral output devices (not shown) such as speakers and printers.

The personal computer 720 may operate in a networked environment using logical connections to one or more remote computers, such as a remote computer 749. The remote computer 749 may be another personal computer, a server, a router, a network PC, a peer device or other common network node, and typically includes many or all of the elements described above relative to the personal computer 720, although only a memory storage device 750 has been illustrated in FIG. 7. The logical connections depicted in FIG. 7 include a local area network (LAN) 751 and a wide area network (WAN) 752. Such networking environments are commonplace in offices, enterprise-wide computer networks, intranets and the Internet.

When used in a LAN networking environment, the personal computer 720 is connected to the local network 751 through a network interface or adapter 753. When used in a WAN networking environment, the personal computer 720 typically includes a modem 754 or other means for establishing communications over the wide are network 752, such as the Internet. The modem 754, which may be internal or external, is connected to the system bus 723 via the serial port interface 746. In a networked environment program modules depicted relative to the personal computer 720, or portions thereof, may be stored in the remote memory storage device. It will be appreciated that the network connections shown are exemplary and other means of establishing communications between the computers may be used.

Figure 8:
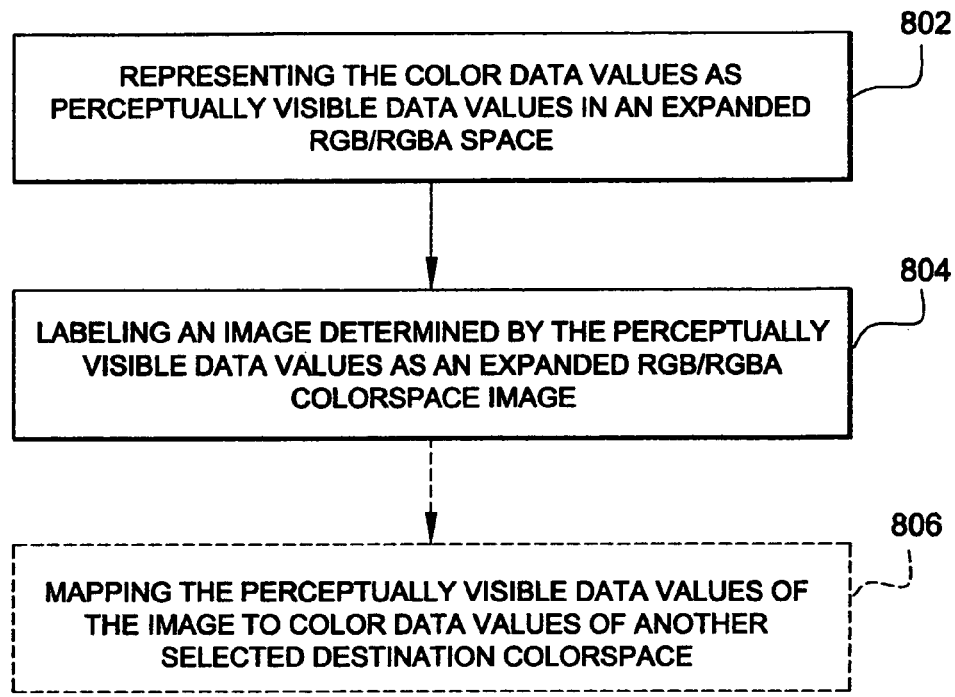
FIG. 8 is a flow chart showing one embodiment of steps of a method of representing color in images using color data values for an expanded colorspace substantially without visually perceptible error in accordance with the present invention.

Thus, as shown in FIG. 8, the present invention provides a method of representation of color in images using color data values for an expanded colorspace, e.g., an expanded RGB/RGBA colorspace, that encompasses at least a visually perceptible colorspace, having at least a precision sufficient to represent visible colors substantially without visually perceptible error. The method includes the steps of: representing 802 the color data values as perceptually visible data values in an expanded RGB/RGBA space and labeling 804 an image determined by the perceptually visible data values as an expanded RGB/RGBA colorspace image. The method may also include mapping 806 the perceptually visible data values of the image to color data values of another selected destination colorspace. Where the perceptually visible data values may lie outside a predetermined range, -the mapping may include clipping the perceptually visible data values for the selected destination colorspace. Mapping may include utilizing a predetermined transformation function that maps the perceptually visible data values to color data values in the selected destination colorspace. Typically, the expanded RGB/RGBA colorspace is linear in visual intensity.

Figure 9:
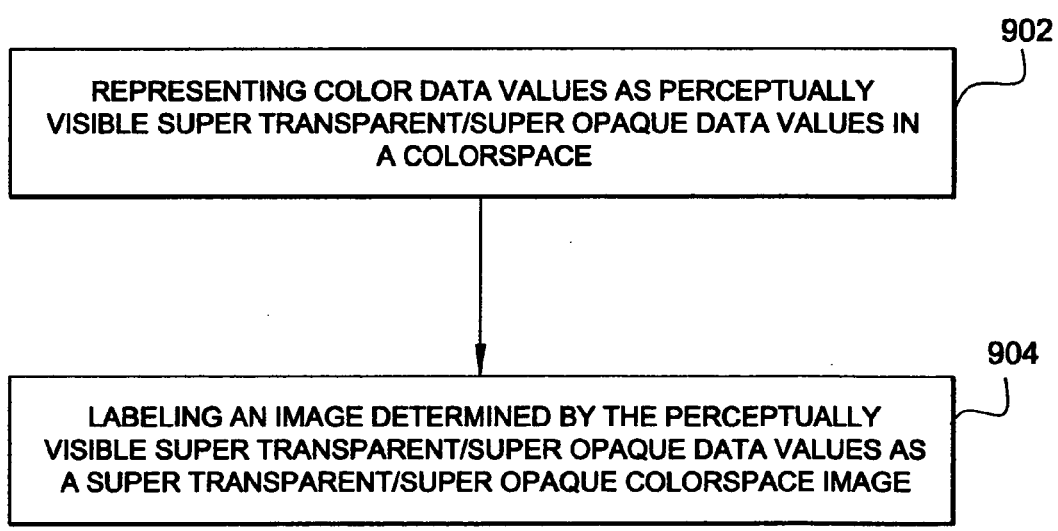
FIG. 9 is a flow chart show one embodiment of steps of the method of the present invention providing for representing at least one of: super transparent and super opaque colors using an alpha channel.

As shown in FIG. 9, the method of the present invention provides for representing at least one of: super transparent and super opaque colors using an alpha channel. The method includes the steps of: representing 902 color data values as perceptually visible super transparent/super opaque data values in a colorspace and labeling 904 an image determined by the perceptually visible super transparent/super opaque data values as a super transparent/super opaque colorspace image. Color operations defined in the RGB/RGBA colorspace may be extended to the expanded RGB/RGBA colorspace. In one embodiment, the alpha channel includes 16 bits to provide increased precision.

Although the present invention has been described in relation to particular preferred embodiments thereof, many variations, equivalents, modifications and other uses will become apparent to those skilled in the art. It is preferred, therefore, that the present invention be limited not by the specific disclosure herein, but only by the appended claims.

What is claimed is:

1. A method for providing a color space representation of color images in a color management system, comprising the steps of:
   mapping RGB color data values representing an image in a first device into gamut expanded sRGB color data values of a gamut expanded sRGB color space; and
   converting the gamut expanded sRGB color data values of the gamut expanded sRGB color space into RGB color data values representing an image in a second device, the RGB color data values of the first device being different from the RGB color data values of the second device and the physical appearance of the image in the first device being the same as the physical appearance of the image in the second device,
   wherein the step of mapping includes utilizing multiplication of $R_0$, $G_0$, $B_0$ values by a predetermined matrix, where the $R_0$, $G_0$, and $B_0$ values denote normalized numerically linear red, green and blue components for a color value, wherein XYZ values are obtained in accordance with the following:

$$\begin{pmatrix} X \\ Y \\ Z \\ 1 \end{pmatrix} = M^{-1} \begin{pmatrix} R_0 \\ G_0 \\ B_0 \\ 1 \end{pmatrix}, \text{ where } M^{-1} = \begin{bmatrix} n_{XR} & n_{XG} & n_{XB} & u_X \\ n_{YR} & n_{YG} & n_{YB} & u_Y \\ n_{ZR} & n_{ZG} & n_{ZB} & u_Z \\ 0 & 0 & 0 & 1 \end{bmatrix},$$

wherein X, Y, and Z denote 1931 Commission Internationale de l'Eclairage XYZ values where Y has been normalized to 1, wherein the XYZ values with respect to the $D_{65}$ standard are obtained in accordance with the following:

$$\begin{cases} X_{D65} = x_{D65}/y_{D65} = 0.9502 \\ Y_{D65} = 1.0 \\ Z_{D65} = (1.0 - x_{D65} - y_{D65})/y_{D65} = 1.0887 \end{cases},$$

wherein a transformation matrix from XYZ to the gamut expanded sRGB color data values of the gamut expanded sRGB color space is obtained in accordance with the following:

$$M_w = M_{D65} S_w, \text{ where } M_{D65} = \begin{bmatrix} 3.2410 & -1.5374 & -0.4986 & 0 \\ -0.9692 & 1.8760 & 0.0416 & 0 \\ 0.0556 & -0.2040 & 1.0570 & 0 \\ 0 & 0 & 0 & 1 \end{bmatrix} \text{ and,}$$

$$\text{where } S_w = \begin{bmatrix} X_{D65}/X_w & 0 & 0 & 0 \\ 0 & 1 & 0 & 0 \\ 0 & 0 & Z_{D65}/Z_w & 0 \\ 0 & 0 & 0 & 1 \end{bmatrix},$$

wherein the step of converting includes converting from the gamut expanded sRGB color data values of the gamut expanded sRGB color space to XYZ values based upon a transverse matrix obtained in accordance with the following:

$$M_w^{-1} = S_w^{-1} M_{D65}^{-1}, \text{ where } M_{D65}^{-1} = \begin{bmatrix} 0.4124 & 0.3576 & 0.1805 & 0 \\ 0.2126 & 0.7152 & 0.0722 & 0 \\ 0.0193 & 0.1192 & 0.9505 & 0 \\ 0 & 0 & 0 & 1 \end{bmatrix} \text{ and,}$$

$$\text{where } S_w^{-1} = \begin{bmatrix} X_w/X_{D65} & 0 & 0 & 0 \\ 0 & 1 & 0 & 0 \\ 0 & 0 & Z_w/Z_{D65} & 0 \\ 0 & 0 & 0 & 1 \end{bmatrix},$$

wherein $X_w$ and $Z_w$ denote corresponding X and Z values with respect to a standard illuminant defined by CIE, wherein the RGB color data values representing the image in the second device are obtained in accordance with the following:

$$\begin{pmatrix} R_0 \\ G_0 \\ B_0 \\ 1 \end{pmatrix} = M \begin{pmatrix} X \\ Y \\ Z \\ 1 \end{pmatrix}, \text{ where } M = \begin{bmatrix} m_{RX} & m_{RY} & m_{RZ} & t_R \\ m_{GX} & m_{GY} & m_{GZ} & t_G \\ m_{BX} & m_{BY} & m_{BZ} & t_B \\ 0 & 0 & 0 & 1 \end{bmatrix},$$

wherein m denotes a rotational part, t denotes a transitional part, n denotes an inverse rotational part, and u denotes an inverse transitional part.

2. The method of claim 1 wherein if the color data values in the gamut expanded sRGB color space lie outside a range of the RGB color data values of the second device, further including clipping the color data values for the second device.

3. The method of claim 2, wherein mapping includes, where color data values of the first device have been represented using signed 16 bit values and 13 bits of decimal precision, clipping the 16 bit values below 0 and above 8192 to convert the 16 bit values to 8 bit values.

4. The method of claim 1 wherein the gamut expanded sRGB color space is linear in visual intensity.

5. The method of claim 1 wherein the gamut expanded sRGB color space comprises an XsRGB color space that includes at least the visible range of color values, and where selected, the gamut expanded sRGB color space includes an alpha channel for at least one of: transparency information and opaqueness information.

6. The method of claim 1 wherein the gamut expanded sRGB color space includes a color space defined by a gamut that extends into negative component values and beyond 1.0 when normalized to 1.0 in RGB.

7. The method of claim 1 wherein each color data value of the image in the first device uses a signed 16 bit integer and 13 bits are used as a decimal portion.

8. The method of claim 7 wherein 16 bit components $R_{16}$, $G_{16}$ and $B_{16}$ are given by:

$$\begin{bmatrix} R_{16} \\ G_{16} \\ B_{16} \end{bmatrix} = 8192 \times \begin{bmatrix} R_0 \\ G_0 \\ B_0 \end{bmatrix}$$

where the $R_0$, $G_0$, and $B_0$ values denote normalized numerically linear red, green and blue components for a color value.

9. The method according to claim 1, wherein the color data values of the first device are one of: non-premultiplied color data values, premultiplied color data values, and normalized numerically linear premultiplied color data values.

10. In a digitized image processing system in which an image digitizer outputs digital signals representing an image, a method for providing representation of color images from measured RGB color data values in a color management system, comprising the steps of:

mapping the measured RGB color data values to a gamut expanded sRGB color space, wherein the gamut expanded sRGB color space includes color data values beyond a reproduction range of a specific device and includes all colors in a humanly visible gamut; and converting the gamut expanded sRGB color data values of the gamut expanded sRGB color space into RGB color data values representing an image in a destination device, the measured RGB color data values being different from the RGB color data values of the destination device and the physical appearance of the image output by the image digitizer being the same as the physical appearance of the image in the destination device, wherein the step of mapping includes utilizing multiplication of $R_0$, $G_0$, $B_0$ values by a predetermined matrix, where the $R_0$, $G_0$, and $B_0$ values denote normalized numerically linear red, green and blue components for a color value, wherein XYZ values are obtained in accordance with the following:

$$\begin{pmatrix} X \\ Y \\ Z \\ 1 \end{pmatrix} = M^{-1} \begin{pmatrix} R_0 \\ G_0 \\ B_0 \\ 1 \end{pmatrix}, \text{ where } M^{-1} = \begin{bmatrix} n_{XR} & n_{XG} & n_{XB} & u_X \\ n_{YR} & n_{YG} & n_{YB} & u_Y \\ n_{ZR} & n_{ZG} & n_{ZB} & u_Z \\ 0 & 0 & 0 & 1 \end{bmatrix},$$

wherein X, Y, and Z denote 1931 Commission Internationale de l'Eclairage XYZ values where Y has been normalized to 1, wherein the XYZ values with respect to the $D_{65}$ standard are obtained in accordance with the following:

$$\begin{cases} X_{D65} = x_{D65}/y_{D65} = 0.9502 \\ Y_{D65} = 1.0 \\ Z_{D65} = (1.0 - x_{D65} - y_{D65})/y_{D65} = 1.0887 \end{cases},$$

wherein a transformation matrix from XYZ to the gamut expanded sRGB color data values of the gamut expanded sRGB color space is obtained in accordance with the following:

$$M_w = M_{D65} S_w,$$

where $M_{D65} = \begin{bmatrix} 3.2410 & -1.5374 & -0.4986 & 0 \\ -0.9692 & 1.8760 & 0.0416 & 0 \\ 0.0556 & -0.2040 & 1.0570 & 0 \\ 0 & 0 & 0 & 1 \end{bmatrix}$ and, where $S_w = \begin{bmatrix} X_w/X_{D65} & 0 & 0 & 0 \\ 0 & 1 & 0 & 0 \\ 0 & 0 & Z_w/Z_{D65} & 0 \\ 0 & 0 & 0 & 1 \end{bmatrix}$, wherein the step of converting includes converting from the gamut expanded sRGB color data values of the gamut expanded sRGB color space to XYZ values based upon a transverse matrix obtained in accordance with the following:

$$M_w^{-1} = S_w^{-1} M_{D65}^{-1},$$

where $M_{D65}^{-1} = \begin{bmatrix} 0.4124 & 0.3576 & 0.1805 & 0 \\ 0.21262 & 0.7152 & 0.0722 & 0 \\ 0.0193 & 0.1192 & 0.9505 & 0 \\ 0 & 0 & 0 & 1 \end{bmatrix}$ and, $$\text{where } S_w^{-1} = \begin{bmatrix} X_{D65}/X_w & 0 & 0 & 0 \\ 0 & 1 & 0 & 0 \\ 0 & 0 & Z_{D65}/Z_w & 0 \\ 0 & 0 & 0 & 1 \end{bmatrix},$$

wherein $X_w$ and $Z_w$ denote corresponding X and Z values with respect to a standard illuminant defined by CIE, wherein the RGB color data values representing the image in the destination device are obtained in accordance with the following:

$$\begin{pmatrix} R_0 \\ G_0 \\ B_0 \\ 1 \end{pmatrix} = M \begin{pmatrix} X \\ Y \\ Z \\ 1 \end{pmatrix},$$

$$\text{where } M = \begin{bmatrix} m_{RX} & m_{RY} & m_{RZ} & t_R \\ m_{GX} & m_{GY} & m_{GZ} & t_G \\ m_{BX} & m_{BY} & m_{BZ} & t_B \\ 0 & 0 & 0 & 1 \end{bmatrix},$$

where m denotes a rotational part, t denotes a transitional part, n denotes an inverse rotational part, and u denotes an inverse transitional part.

11. The method of claim 10 wherein the gamut expanded sRGB color space includes an XsRGB color space defined by a gamut that extends into negative component values and beyond 1.0 when normalized to 1.0 in RGB, and where selected, wherein the expanded sRGB color space includes an alpha channel for at least one of: transparency information and opaqueness information.

12. The method of claim 10, wherein each measured RGB color data value uses a 16 bit integer and 13 bits are used as a decimal portion.

13. The method of claim 10, wherein 16 bit components $R_{16}$, $G_{16}$, and $B_{16}$ of measured color data values are given by:

$$\begin{bmatrix} R_{16} \\ G_{16} \\ B_{16} \end{bmatrix} = 8192 \times \begin{bmatrix} R_0 \\ G_0 \\ B_0 \end{bmatrix}$$

where the $R_0$, $G_0$, $B_0$ values denote normalized numerically linear red, green and blue components for a color value.

14. The method of claim 10, wherein if measured RGB color data values have been represented using signed 16 bit values with 13 bits of decimal precision, further including clipping the 16 bit values below 0 and above 8192 to convert the 16 bit values to 8 bit values.

15. The method of claim 10, wherein the measured RGB color data values are one of: non-premultiplied color data values, premultiplied color data values, and normalized numerically linear premultiplied color data values.

16. A computer-readable medium having computer-executable instructions for performing the steps of:

mapping measured color data values to a gamut expanded sRGB color space, wherein the gamut expanded sRGB color space includes color data values beyond a reproduction range of a specific device and includes all colors in a humanly visible gamut; and converting the gamut expanded sRGB color data values of the gamut expanded sRGB color space into RGB color data values representing an image in a destination device, the measured color data values being different from the RGB color data values of the destination device and the physical appearance of an image output by a digitizer device being the same as the physical appearance of the image in the destination device, wherein the step of mapping includes utilizing multiplication of $R_0$, $G_0$, $B_0$ values by a predetermined matrix, where the $R_0$, $G_0$, and $B_0$ values denote normalized numerically linear red, green and blue components for a color value, wherein XYZ values are obtained in accordance with the following:

$$\begin{pmatrix} X \\ Y \\ Z \\ 1 \end{pmatrix} = M^{-1} \begin{pmatrix} R_0 \\ G_0 \\ B_0 \\ 1 \end{pmatrix},$$

$$\text{where } M^{-1} = \begin{bmatrix} n_{XR} & n_{XG} & n_{XB} & u_X \\ n_{YR} & n_{YG} & n_{YB} & u_Y \\ n_{ZR} & n_{ZG} & n_{ZB} & u_Z \\ 0 & 0 & 0 & 1 \end{bmatrix},$$

wherein X, Y, and Z denote 1931 Commission Internationale de l'Eclairage XYZ values where Y has been normalized to 1, wherein the XYZ values with respect to the $D_{65}$ standard are obtained in accordance with the following:

$$\begin{cases} X_{D65} = x_{D65}/y_{D65} = 0.9502 \\ Y_{D65} = 1.0 \\ Z_{D65} = (1.0 - x_{D65} - y_{D65})/y_{D65} = 1.0887 \end{cases},$$

wherein a transformation matrix from XYZ to the gamut expanded sRGB color data values of the gamut expanded sRGB color space is obtained in accordance with the following:

$$M_w = M_{D65} S_w,$$

$$\text{where } M_{D65} = \begin{bmatrix} 3.2410 & -1.5374 & -0.4986 & 0 \\ -0.9692 & 1.8760 & 0.0416 & 0 \\ 0.0556 & -0.2040 & 1.0570 & 0 \\ 0 & 0 & 0 & 1 \end{bmatrix} \text{ and,}$$

$$\text{where } S_w = \begin{bmatrix} X_{D65}/X_w & 0 & 0 & 0 \\ 0 & 1 & 0 & 0 \\ 0 & 0 & Z_{D65}/Z_w & 0 \\ 0 & 0 & 0 & 1 \end{bmatrix},$$

wherein the step of converting includes converting from the gamut expanded sRGB color data values of the gamut expanded sRGB color space to XYZ values based upon a transverse matrix obtained in accordance with the following:

$$M_w^{-1} = S_w^{-1} M_{D65}^{-1},$$

where $M_{D65}^{-1} = \begin{bmatrix} 0.4124 & 0.3576 & 0.1805 & 0 \\ 0.21262 & 0.7152 & 0.0722 & 0 \\ 0.0193 & 0.1192 & 0.9505 & 0 \\ 0 & 0 & 0 & 1 \end{bmatrix}$ and, where $S_w^{-1} = \begin{bmatrix} X_w/X_{D65} & 0 & 0 & 0 \\ 0 & 1 & 0 & 0 \\ 0 & 0 & Z_w/Z_{D65} & 0 \\ 0 & 0 & 0 & 1 \end{bmatrix},$ wherein $X_w$ and $Z_w$ denote corresponding X and Z values with respect to a standard illuminant defined by CIE, wherein the RGB color data values representing the image in the destination device are obtained in accordance with the following:

$$\begin{pmatrix} R_0 \\ G_0 \\ B_0 \\ 1 \end{pmatrix} = M \begin{pmatrix} X \\ Y \\ Z \\ 1 \end{pmatrix},$$

where $M = \begin{bmatrix} m_{RX} & m_{RY} & m_{RZ} & t_R \\ m_{GX} & m_{GY} & m_{GZ} & t_G \\ m_{BX} & m_{BY} & m_{BZ} & t_B \\ 0 & 0 & 0 & 1 \end{bmatrix},$ wherein m denotes a rotational part, t denotes a transitional part, n denotes an inverse rotational part, and u denotes an inverse transitional part.

17. In a digitized image processing system in which an image digitizer utilizes color image information to output RGB digital color signals representing a color image to an apparatus that uses the digital color signals to provide representation of a color image in a color management system, the apparatus comprising:
an expanded sRGB color space mapper, for mapping the digital color signals representing RGB color data values of the image digitizer to gamut expanded sRGB color space values; and
a processor for converting said gamut expanded sRGB color space values to RGB color space values representing an image in a destination peripheral device, the RGB color data values of the image digitizer being different from the RGB color data values of the destination peripheral device and the physical appearance of the image in the image digitizer being the same as the physical appearance of the image in the destination peripheral device,
wherein the expanded sRGB color space mapper for mapping includes utilizing multiplication of $R_0$, $G_0$, $B_0$ values by a predetermined matrix, where the $R_0$, $G_0$, and $B_0$ values denote normalized numerically linear red, green and blue components for a color value,
wherein XYZ values are obtained in accordance with the following:

$$\begin{pmatrix} X \\ Y \\ Z \\ 1 \end{pmatrix} = M^{-1} \begin{pmatrix} R_0 \\ G_0 \\ B_0 \\ 1 \end{pmatrix},$$

where $M^{-1} = \begin{bmatrix} n_{XR} & n_{XG} & n_{XB} & u_X \\ n_{YR} & n_{YG} & n_{YB} & u_Y \\ n_{ZR} & n_{ZG} & n_{ZB} & u_Z \\ 0 & 0 & 0 & 1 \end{bmatrix},$ wherein X, Y, and Z denote 1931 Commission Internationale de l'Eclairage XYZ values where Y has been normalized to 1, wherein the XYZ values with respect to the $D_{65}$ standard are obtained in accordance with the following:

$$\begin{cases} X_{D65} = x_{D65}/y_{D65} = 0.9502 \\ Y_{D65} = 1.0 \\ Z_{D65} = (1.0 - x_{D65} - y_{D65})/y_{D65} = 1.0887 \end{cases},$$

wherein a transformation matrix from XYZ to the gamut expanded sRGB color data values is obtained in accordance with the following:

$$M_w = M_{D65} S_w,$$

where $M_{D65} = \begin{bmatrix} 3.2410 & -1.5374 & -0.4986 & 0 \\ -0.9692 & 1.8760 & 0.0416 & 0 \\ 0.0556 & -0.2040 & 1.0570 & 0 \\ 0 & 0 & 0 & 1 \end{bmatrix}$ and, where $S_w = \begin{bmatrix} X_{D65}/X_w & 0 & 0 & 0 \\ 0 & 1 & 0 & 0 \\ 0 & 0 & Z_{D65}/Z_w & 0 \\ 0 & 0 & 0 & 1 \end{bmatrix},$ wherein the step of converting includes converting from the gamut expanded sRGB color data values to XYZ values based upon a transverse matrix obtained in accordance with the following:

$$M_w^{-1} = S_w^{-1} M_{D65}^{-1},$$

where $M_{D65}^{-1} = \begin{bmatrix} 0.4124 & 0.3576 & 0.1805 & 0 \\ 0.21262 & 0.7152 & 0.0722 & 0 \\ 0.0193 & 0.1192 & 0.9505 & 0 \\ 0 & 0 & 0 & 1 \end{bmatrix}$ and, where $S_w^{-1} = \begin{bmatrix} X_w/X_{D65} & 0 & 0 & 0 \\ 0 & 1 & 0 & 0 \\ 0 & 0 & Z_w/Z_{D65} & 0 \\ 0 & 0 & 0 & 1 \end{bmatrix},$ wherein $X_w$ and $Z_w$ denote corresponding X and Z values with respect to a standard illuminant defined by CIE, wherein the RGB color data values representing the image in the destination peripheral device are obtained in accordance with the following:

$$\begin{pmatrix} R_0 \\ G_0 \\ B_0 \\ 1 \end{pmatrix} = M \begin{pmatrix} X \\ Y \\ Z \\ 1 \end{pmatrix},$$

where $M = \begin{bmatrix} m_{RX} & m_{RY} & m_{RZ} & t_R \\ m_{GX} & m_{GY} & m_{GZ} & t_G \\ m_{BX} & m_{BY} & m_{BZ} & t_B \\ 0 & 0 & 0 & 1 \end{bmatrix}$, wherein m denotes a rotational part, t denotes a transitional part, n denotes an inverse rotational part, and u denotes an inverse transitional part.

18. A method for representing color images in a color management system in a gamut expanded sRGB color space and further representing at least one of super transparent and super opaque colors using an alpha channel, comprising the steps of:

representing RGB color data values of a source peripheral device as one of perceptually visible super transparent data values and perceptually visible super opaque data values in said gamut expanded sRGB color space; and converting one of said perceptually visible super transparent data values and perceptually visible super opaque data values to RGB color data values of a destination peripheral device, the RGB color data values of the source peripheral device being different from the RGB color data values of the destination peripheral device and the physical appearance of an image represented by the RGB color data values in the source peripheral device being the same as the physical appearance of an image represented by the RGB color date values in the destination peripheral device, wherein the step of representing includes utilizing multiplication of $R_0$, $G_0$, $B_0$ values by a predetermined matrix, where the $R_0$, $G_0$, and $B_0$ values denote normalized numerically linear red, green and blue components for a color value, wherein XYZ values are obtained in accordance with the following:

$$\begin{pmatrix} X \\ Y \\ Z \\ 1 \end{pmatrix} = M^{-1} \begin{pmatrix} R_0 \\ G_0 \\ B_0 \\ 1 \end{pmatrix},$$

where $M^{-1} = \begin{bmatrix} n_{XR} & n_{XG} & n_{XB} & u_X \\ n_{YR} & n_{YG} & n_{YB} & u_Y \\ n_{ZR} & n_{ZG} & n_{ZB} & u_Z \\ 0 & 0 & 0 & 1 \end{bmatrix}$, wherein X, Y, and Z denote 1931 Commission Internationale de l'Eclairage XYZ values where Y has been normalized to 1, wherein the XYZ values with respect to the $D_{65}$ standard are obtained in accordance with the following:

$$\begin{cases} X_{D65} = x_{D65}/y_{D65} = 0.9502 \\ Y_{D65} = 1.0 \\ Z_{D65} = (1.0 - x_{D65} - y_{D65})/y_{D65} = 1.0887 \end{cases},$$

wherein a transformation matrix from XYZ to gamut expanded sRGB color data values of the gamut expanded sRGB color space is obtained in accordance with the following:

$$M_w = M_{D65} S_w,$$

where $M_{D65} = \begin{bmatrix} 3.2410 & -1.5374 & -0.4986 & 0 \\ -0.9692 & 1.8760 & 0.0416 & 0 \\ 0.0556 & -0.2040 & 1.0570 & 0 \\ 0 & 0 & 0 & 1 \end{bmatrix}$ and, where $S_w = \begin{bmatrix} X_{D65}/X_w & 0 & 0 & 0 \\ 0 & 1 & 0 & 0 \\ 0 & 0 & Z_{D65}/Z_w & 0 \\ 0 & 0 & 0 & 1 \end{bmatrix}$, wherein the step of converting includes converting from the gamut expanded sRGB color data values of the gamut expanded sRGB color space to XYZ values based upon a transverse matrix obtained in accordance with the following:

$$M_w^{-1} = S_w^{-1} M_{D65}^{-1},$$

where $M_{D65}^{-1} = \begin{bmatrix} 0.4124 & 0.3576 & 0.1805 & 0 \\ 0.2126 & 0.7152 & 0.0722 & 0 \\ 0.0193 & 0.1192 & 0.9505 & 0 \\ 0 & 0 & 0 & 1 \end{bmatrix}$ and, where $S_w^{-1} = \begin{bmatrix} X_w/X_{D65} & 0 & 0 & 0 \\ 0 & 1 & 0 & 0 \\ 0 & 0 & Z_w/Z_{D65} & 0 \\ 0 & 0 & 0 & 1 \end{bmatrix}$, wherein $X_w$ and $Z_w$ denote corresponding X and Z values respect to a standard illuminant defined by CIE, wherein the RGB color data values representing the image in the destination peripheral device are obtained in accordance with the following:

$$\begin{pmatrix} R_0 \\ G_0 \\ B_0 \\ 1 \end{pmatrix} = M \begin{pmatrix} X \\ Y \\ Z \\ 1 \end{pmatrix},$$

where $M = \begin{bmatrix} m_{RX} & m_{RY} & m_{RZ} & t_R^- \\ m_{GX} & m_{GY} & m_{GZ} & t_G \\ m_{BX} & m_{BY} & m_{BZ} & t_B \\ 0 & 0 & 0 & 1 \end{bmatrix}$, wherein m denotes a rotational part, t denotes a transitional part, n denotes an inverse rotational part, and u denotes an inverse transitional part.

19. A method for converting color data values comprising the steps of:

mapping color data values representing an image in a first device into color data values of a XsRGB color space; and converting the XsRGB color data values into color data values representing an image in a second device, wherein the step of mapping includes utilizing multiplication of $R_0$, $G_0$, $B_0$ values by a predetermined matrix, where the $R_0$, $G_0$, and $B_0$ values denote normalized numerically linear red, green and blue components for a color value, wherein XYZ values are obtained in accordance with the following:

$$\begin{pmatrix} X \\ Y \\ Z \\ 1 \end{pmatrix} = M^{-1} \begin{pmatrix} R_0 \\ G_0 \\ B_0 \\ 1 \end{pmatrix},$$

where $M^{-1} = \begin{bmatrix} n_{XR} & n_{XG} & n_{XB} & u_X \\ n_{YR} & n_{YG} & n_{YB} & u_Y \\ n_{ZR} & n_{ZG} & n_{ZB} & u_Z \\ 0 & 0 & 0 & 1 \end{bmatrix},$ wherein X, Y, and Z denote 1931 Commission Internationale de l'Eclairage XYZ values where Y has been normalized to 1, wherein the XYZ values with respect to the $D_{65}$ standard are obtained in accordance with the following:

$$\begin{cases} X_{D65} = x_{D65}/y_{D65} = 0.9502 \\ Y_{D65} = 1.0 \\ Z_{D65} = (1.0 - x_{D65} - y_{D65})/y_{D65} = 1.0887 \end{cases},$$

wherein a transformation matrix from XYZ to the XsRGB color space is obtained in accordance with the following:

$$M_w = M_{D65} S_w,$$

where $M_{D65} = \begin{bmatrix} 3.2410 & -1.5374 & -0.4986 & 0 \\ -0.9692 & 1.8760 & 0.0416 & 0 \\ 0.0556 & -0.2040 & 1.0570 & 0 \\ 0 & 0 & 0 & 1 \end{bmatrix}$ and, where $S_w = \begin{bmatrix} X_{D65}/X_w & 0 & 0 & 0 \\ 0 & 1 & 0 & 0 \\ 0 & 0 & Z_{D65}/Z_w & 0 \\ 0 & 0 & 0 & 1 \end{bmatrix},$ wherein the step of converting includes converting from the XsRGB color data values to XYZ values based upon a transverse matrix obtained in accordance with the following:

$$M_w^{-1} = S_w^{-1} M_{D65}^{-1},$$

where $M_{D65}^{-1} = \begin{bmatrix} 0.4124 & 0.3576 & 0.1805 & 0 \\ 0.2126 & 0.7152 & 0.0722 & 0 \\ 0.0193 & 0.1192 & 0.9505 & 0 \\ 0 & 0 & 0 & 1 \end{bmatrix}$ and, where $S_w^{-1} = \begin{bmatrix} X_w/X_{D65} & 0 & 0 & 0 \\ 0 & 1 & 0 & 0 \\ 0 & 0 & Z_w/Z_{D65} & 0 \\ 0 & 0 & 0 & 1 \end{bmatrix},$ wherein $X_w$ and $Z_w$ denote corresponding X and Z values with respect to a standard illuminant defined by CIE, wherein the color data values representing the image in the second device are obtained in accordance with the following:

$$\begin{pmatrix} R_0 \\ G_0 \\ B_0 \\ 1 \end{pmatrix} = M \begin{pmatrix} X \\ Y \\ Z \\ 1 \end{pmatrix},$$

where $M = \begin{bmatrix} m_{RX} & m_{RY} & m_{RZ} & t_R \\ m_{GX} & m_{GY} & m_{GZ} & t_G \\ m_{BX} & m_{BY} & m_{BZ} & t_B \\ 0 & 0 & 0 & 1 \end{bmatrix},$ wherein m denotes a rotational part, t denotes a transitional part, n denotes an inverse rotational part, and u denotes an inverse transitional part.

20. A computer-readable medium comprising computer readable instructions that, when executed, cause a computer to perform a method for converting color data values, comprising:

mapping color data values representing an image in a first device into color data values of a XsRGB color space; and converting the XsRGB color data values into color data values representing an image in a second device, wherein the step of mapping includes utilizing multiplication of $R_0$, $G_0$, $B_0$ values by a predetermined matrix, where the $R_0$, $G_0$, and $B_0$ values denote normalized numerically linear red, green and blue components for a color value, wherein XYZ values are obtained in accordance with the following:

$$\begin{pmatrix} X \\ Y \\ Z \\ 1 \end{pmatrix} = M^{-1} \begin{pmatrix} R_0 \\ G_0 \\ B_0 \\ 1 \end{pmatrix},$$

where $M^{-1} = \begin{bmatrix} n_{XR} & n_{XG} & n_{XB} & u_X \\ n_{YR} & n_{YG} & n_{YB} & u_Y \\ n_{ZR} & n_{ZG} & n_{ZB} & u_Z \\ 0 & 0 & 0 & 1 \end{bmatrix},$ wherein X, Y, and Z denote 1931 Commission Internationale de l'Eclairage XYZ values where Y has been normalized to 1, wherein the XYZ values with respect to the $D_{65}$ standard are obtained in accordance with the following:

$$\begin{cases} X_{D65} = x_{D65}/y_{D65} = 0.9502 \\ Y_{D65} = 1.0 \\ Z_{D65} = (1.0 - x_{D65} - y_{D65})/y_{D65} = 1.0887 \end{cases},$$

wherein a transformation matrix from XYZ to the XsRGB color space is obtained in accordance with the following:

$$M_w = M_{D65} S_w,$$

$$\text{where } M_{D65} = \begin{bmatrix} 3.2410 & -1.5374 & -0.4986 & 0 \\ -0.9692 & 1.8760 & 0.0416 & 0 \\ 0.0556 & -0.2040 & 1.0570 & 0 \\ 0 & 0 & 0 & 1 \end{bmatrix} \text{ and,}$$

$$\text{where } S_w = \begin{bmatrix} X_{D65}/X_w & 0 & 0 & 0 \\ 0 & 1 & 0 & 0 \\ 0 & 0 & Z_{D65}/Z_w & 0 \\ 0 & 0 & 0 & 1 \end{bmatrix},$$

wherein $X_w$ and $Z_w$ denote corresponding X and Z values with respect to a standard illuminant defined by CIE, wherein the step of converting includes converting from the XsRGB color data values to XYZ values based upon a transverse matrix obtained in accordance with the following:

$$M_w^{-1} = S_w^{-1} M_{D65}^{-1},$$

$$\text{where } M_{D65}^{-1} = \begin{bmatrix} 0.4124 & 0.3576 & 0.1805 & 0 \\ 0.2126 & 0.7152 & 0.0722 & 0 \\ 0.0193 & 0.1192 & 0.9505 & 0 \\ 0 & 0 & 0 & 1 \end{bmatrix} \text{ and,}$$

$$\text{where } S_w^{-1} = \begin{bmatrix} X_w/X_{D65} & 0 & 0 & 0 \\ 0 & 1 & 0 & 0 \\ 0 & 0 & Z_w/Z_{D65} & 0 \\ 0 & 0 & 0 & 1 \end{bmatrix},$$

wherein the color data values representing the image in the second device are obtained in accordance with the following:

$$\begin{pmatrix} R_0 \\ G_0 \\ B_0 \\ 1 \end{pmatrix} = M \begin{pmatrix} X \\ Y \\ Z \\ 1 \end{pmatrix},$$

$$\text{where } M = \begin{bmatrix} m_{RX} & m_{RY} & m_{RZ} & t_R \\ m_{GX} & m_{GY} & m_{GZ} & t_G \\ m_{BX} & m_{BY} & m_{BZ} & t_B \\ 0 & 0 & 0 & 1 \end{bmatrix},$$

wherein m denotes a rotational part, t denotes a transitional part, n denotes an inverse rotational part, and u denotes an inverse transitional part.

\* \* \* \* \*